Figure 1:
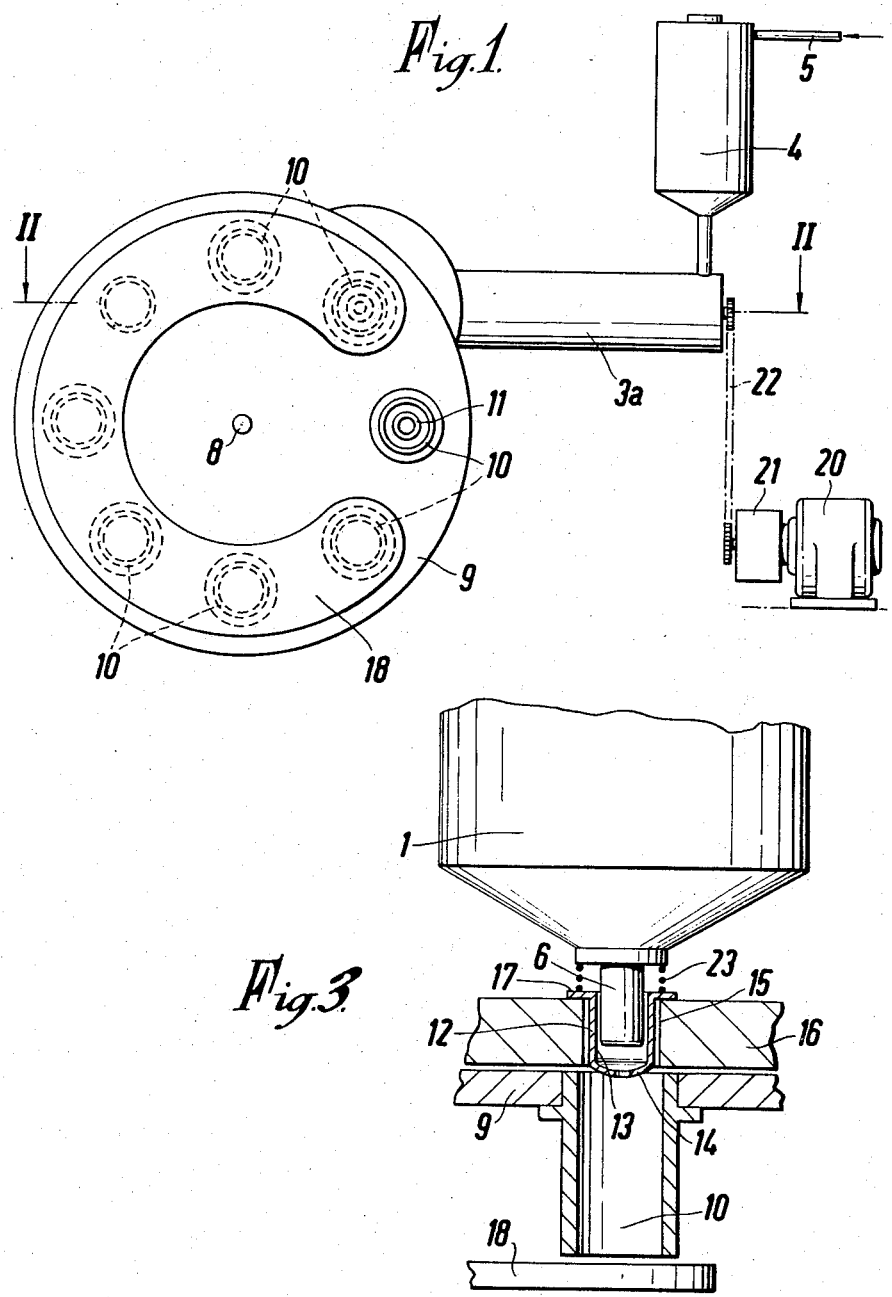

Sept. 19, 1967     T. P. ENGEL     3,342,913
PROCESS AND APPARATUS FOR THE PRODUCTION OF
MOULDINGS OR EXTRUSIONS HAVING A CELLULAR
STRUCTURE FROM THERMOPLASTIC
SYNTHETIC MATERIALS
Filed Nov. 2, 1964     3 Sheets-Sheet 1

INVENTOR
BY Thomas Engel
Sparrow and Sparrow
ATTORNEYS

Sept. 19, 1967　　　　　T. P. ENGEL　　　　　3,342,913
PROCESS AND APPARATUS FOR THE PRODUCTION OF
MOULDINGS OR EXTRUSIONS HAVING A CELLULAR
STRUCTURE FROM THERMOPLASTIC
SYNTHETIC MATERIALS
Filed Nov. 2, 1964　　　　　　　　　　3 Sheets-Sheet 2

INVENTOR
Thomas Engel
BY
Sparrow and Sparrow
ATTORNEYS

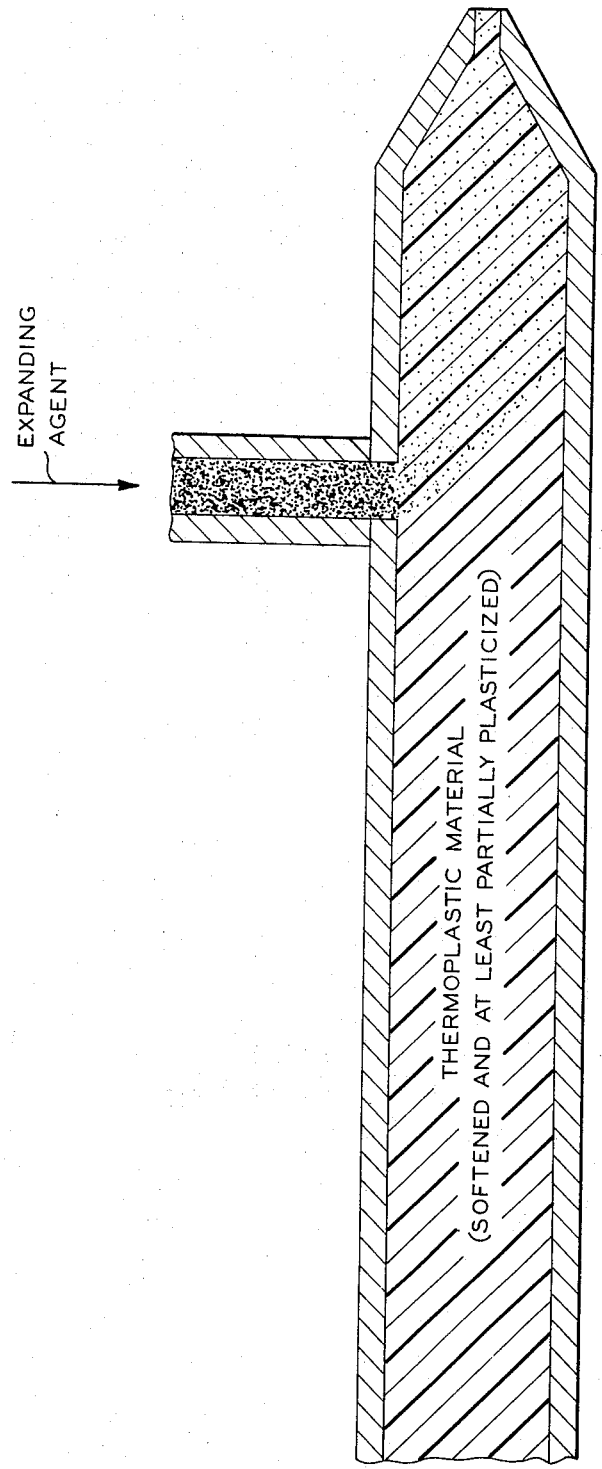

United States Patent Office 3,342,913
Patented Sept. 19, 1967

3,342,913
PROCESS AND APPARATUS FOR THE PRODUCTION OF MOULDINGS OR EXTRUSIONS HAVING A CELLULAR STRUCTURE FROM THERMOPLASTIC SYNTHETIC MATERIALS
Thomas Paul Engel, Offenbach, Heusenstamm, Germany, assignor to Phillips Petroleum Company, a corporation of Delaware
Filed Nov. 2, 1964, Ser. No. 409,046
Claims priority, application Germany, Nov. 29, 1963, E 25,940
36 Claims. (Cl. 264—51)

This invention relates to a process and apparatus for the production of mouldings or extrusions having a cellular structure from thermoplastic synthetic materials. The cellular structure is produced by mixing with the synthetic material an expanding medium, usually in the form of a solid which produces a permanent gas by chemical action when heated, but sometimes in a gaseous form.

The production of articles of this nature has hitherto been carried out in closed moulds which are placed in presses to hold them closed, usually under pressures of between 100 and 500 kg. per sq. cm., since, with known methods of operation, the use of open moulds or moulds under low pressure allowed the expanding gas to escape or to burst the cell walls. Consequently no satisfactory process for the continuous production of such articles has hitherto been devised.

Difficulty has also been encountered in mixing the expanding medium homogeneously with the thermoplastic material at a low enough temperature to prevent premature gas formation, bringing about the gas formation at the desired instant, and keeping the inflated material stable.

It is the object of the present invention to provide a process for the continuous production of mouldings or extrusions having a cellular structure from thermoplastic synthetic materials, and apparatus for carrying out that process.

According to one aspect of the invention, a process for the continuous production of mouldings or extrusions from thermoplastic synthetic materials in which a cellular structure is produced by the incorporation of an expanding medium is characterised in that the plasticising of the synthetic material is performed or completed in a worm machine which also places the said material under compression, the expanding medium being fed into the said machine at a point where the synthetic material is under mechanical pressure and being itself subjected to gas pressure, the expanding medium being mixed with the synthetic material in the worm machine during its passage from the point of entry of the expanding medium to an extrusion nozzle and the temperature and pressure of the mass during such passage being maintained at values such that the expanding medium produces substantially no cell formation, the mass, after emerging from the extrusion nozzle, being subjected to cooling at its outer surface sufficient to at once form a closed but extensible outer skin without setting the interior of the mass, the expanding medium, due to the reduction of pressure, expanding the mass to produce a cellular structure within the said outer skin before setting of the mass takes place.

According to another aspect of the invention, in apparatus for carrying out the process defined in the last preceding paragraph a worm machine for mixing and pressurising the thermoplastic synthetic material and delivering it through an extrusion nozzle has a conveying worm connected to its barrel at a point where the material in the said barrel is subject to compression, the said conveying worm conveying the expanding medium into the barrel from a reservoir to which a gas pressure supply conduit is connected to enable gas pressure to be applied to the material in said reservoir.

The process and apparatus according to the invention will now be described with reference to the accompanying drawings, which show diagrammatically the essential features of an apparatus for carrying out the process.

Figure 2:
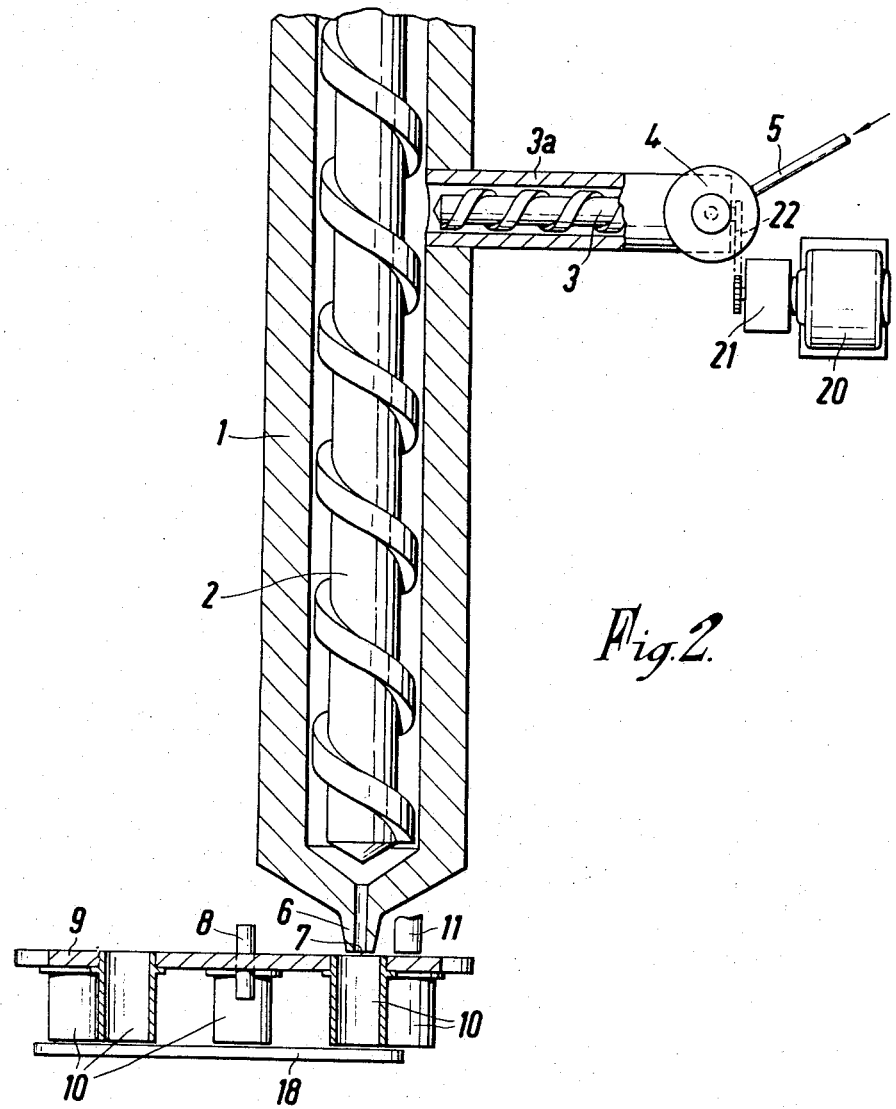

In the drawings:
FIGURE 1 is an end view of the apparatus viewed from the end at which the thermoplastic material is extruded;
FIGURE 2 is a sectional plan on the line II—II of FIGURE 1;
FIGURE 3 is a view on a larger scale, similar to a part of FIGURE 2, showing a preferred form of extrusion nozzle; and
FIGURE 4 is a diagrammatic illustration of the method of the invention.

Referring to the drawings, the apparatus comprises a worm machine for plasticising, or completing the plasticising of the thermoplastic material, the said machine comprising a worm 2 rotatable in a cylindrical housing 1 provided with cavities, not shown, for the circulation of cooling liquid in the known manner.

A barrel 3a, in which is rotatably mounted a worm conveyor 3, opens into the housing 1 at a point where material passing therethrough is already under pressure due to the operation of the worm 2, the other end of the said barrel 3a being connected to a reservoir 4 containing, in pulverulent form, the solid material which is gasified to produce the cell formation. A pipe 5 leading into the top of the reservoir 4 is connected to a source of compressed air or other compressed gas to enable a gas pressure to be maintained in the reservoir above the pulverulent material therein. The worm 3 is driven by an electric motor 20 through a continuously variable change speed gear indicated diagrammatically at 21 and chain-and-sprocket gearing 22, so that the rate at which the pulverulent material is fed into the housing 1 can be changed.

At the forward end of the housing 1 there is provided an extrusion nozzle 6 having a cross-section corresponding to that of the object to be produced. An additional mixing rotor may be provided between the worm 2 and the nozzle 6.

A disc 9, rotatable about a spindle 8 supported in a fixed position relative to the housing 1 is formed with a circular series of openings in which are set open-ended moulds 10, the disc 9 having its rear face in a plane such that it lies very close to the front end of the nozzle 6. The disc 9 is rotatable step-by-step by means which are not shown, about the spindle 8 to bring each mould 10 in turn into alignment with the nozzle 6. A stationary cover plate 18 covers the ends of the moulds 10 remote from the nozzle 6, being cut away at one part to expose the ends of the moulds as they reach a predetermined position, an ejector 11 being provided to push out an object from each mould when it reaches the cut-away part of the plate 18. Preferably, the ejector position is close to the nozzle 6 and the disc 9 rotates in such a direction that the moulds are carried around an angle of nearly 360° between receiving material from the nozzle and having the moulded object ejected therefrom.

It will be apparent that the quantity of material fed into each mould will depend on the time for which each mould dwells in alignment with the nozzle and the rate at which the material is ejected, the disc 9, by passing across the nozzle 6 when it is turned, cutting off the material which has entered the mould.

Up to the time when it passes through the nozzle 6, the material has been held at such a temperature that it remains plastic, and at such a pressure that the expanding medium cannot expand. As soon as it passes through the nozzle, the surface of the material is cooled.

Also, since the mould is exposed externally to the atmosphere, it is kept cool. An outer skin, in a less plastic form than the main body of the extruded material is thus formed, which encloses the said body. The extruded material is of smaller cross-section than the mould, and the expanding medium, the pressure being now relieved, is able to expand the said material, stretching the outer skin, until it fills the mould. The material then sets in the expanded condition to form a body corresponding in shape to the mould.

Special cooling arrangements, using air or a liquid, may be proivded to keep the moulds cool if cooling by the ambient atmosphere is insufficient.

FIGURE 3 of the drawings shows a preferred form of nozzle for use in the apparatus according to the invention in which the fixed nozzle portion 6 has axially movable relative to it an outer nozzle portion 12 the cylindrical inner wall 13 of which is of larger diameter than the outer wall of the fixed nozzle portion 6, so that there is clearance between them. The front end of the nozzle portion 12 has an outer surface 14 having a convex curvature. The nozzle portion 12 is slidably mounted in an opening 15 in a stationary plate 16, its forward movement being limited by the engagement of a flange 17 on its rear end with the plate 16, to a position in which only the convex surface 14, or a part of it, projects beyond the front surface of the plate 16. The rotary disc 9 carrying the moulds 10 is mounted closely adjacent to the plate 16, so that the said convex surface 14 projects into any mould 10 which is aligned with the nozzle.

The plasticised material issuing from the nozzle 6 applies a forward thrust to the nozzle portion 12, and a spring 23 may be provided between the flange 17 and the housing 1 to apply an additional forward thrust. Each time the disc 9 makes a rotary movement it pushes back the nozzle portion 12 to a small extent, the end 14 of the said nozzle portion riding across the surface of the disc and ensuring that the extruded length of material is cut off cleanly.

In a modification of the invention, the mould-supporting disc 9 is dispensed with, and the thermoplastic material is extruded through a nozzle having an opening in the form of an elongated slot, so that it is in the form of a strip, which expands after leaving the nozzle. This strip is led over a lower die having a cavity or cavities of the shape of an article or articles to be produced, the strip being wider than the cavity or cavities. When sufficient material has been extruded to fill the die and overlap it at the ends, an upper die is brought down to cut the strip to the desired shape or shapes and apply slight compression thereto and is held in position whilst setting of the material takes place. This ensures that the material fills the die cavity and sets to the shape of the said cavity.

The output capacity of the process according to the invention, using the apparatus described, depends on a number of factors. For example, in the production of cylindrical plugs from high pressure polythene of fusion index 7, about fifteen kilograms of synthetic plastic material can be passed through per hour. With a compressed air pressure of five atmospheres super-pressure applied to the expanding medium in the reservoir 4, and using a disc 9 carrying 20 moulds, a finished plug is obtained every second. The temperature of the material at the position where the expanding medium is admitted is about 140° C. and the surface temperature of the material at the exit from the nozzle is about 120° C.

The moulds may be made in two or more parts to permit the production of mouldings of shapes such that they could not be removed from a one-piece mould.

The expanding medium may be any substance or mixture of substances which produces a permanent gas on heating, a convenient substrate being ammonium carbonate. The expanding medium, instead of being stored in the reservoir 4 and mixed with the thermoplastic material in pulverulent form, may be stored as a gas under pressure and fed directly into the housing 1 in that form. The said substance is preferably fed into the housing 1 as a mixture with synthetic plastic powder, and dyestuffs, pigments, lubricants and other additives such as stabilisers can also be added to the mixture.

The gas pressure acting on the expanding medium in the reservoir may be applied by compressed air, or, if the thermoplastic material being used is sensitive to oxygen, may be applied by an inert gas such as nitrogen, carbon dioxide or a noble gas. The gas pressure will depend on the nature of the thermoplastic material, the desired degree of foaming and the quantity through-put, but will be at least somewhat higher than the pressure at the point in the housing 1 at which the expanding medium is fed in.

The moulds, not being called upon to withstand any substantial pressure, may be made of metal or of synthetic plastic material.

It will be appreciated that initial softening and partial plasticising of the thermoplastic material takes place before the expanding material is added to it, and can take place at a relatively low temperature, thus reducing the risk of deterioration of the material, and preventing premature decomposition of the expanding material, and gas losses.

If the articles to be produced are of substantial length, the extrusion nozzle may extend into the mould initially and may be withdrawn progressively as the mould is filled. It may also be advantageous, especially in the case of larger mouldings to rotate the moulds during filling. Articles of substantial length produced may be in the form of a tube. This tube can be subsequently deformed to produce a hollow body, as by a process wherein fluid pressure is applied to the interior of the tube.

Instead of finally shaping an article immediately after extrusion of the thermoplastic material, the extruded mass may be cooled sufficiently rapidly to prevent full inflation, and subsequently re-heated after placing in a mould, to provide softening and expansion to the shape of the mould.

I claim:

1. A method of producing a foamed thermoplastic which comprises conveying a thermoplastic material at an elevated temperature and pressure (such that it is at least partially plasticized), introducing forcibly into said thermoplastic material being conveyed a compact mass comprising expanding agent in solid particulate form to form a resulting end mixture under conditions of temperature to form a gas by decomposition of the expanding agent in said thermoplastic, but under a pressure to prevent any substantial formation of cells, and then reducing the pressure on the resulting end mixture to allow the expanding agent to expand and to produce said foamed thermoplastic.

2. A method according to claim 1 wherein said thermoplastic material is polyethylene.

3. A method according to claim 1 wherein the thermoplastic material is partially plasticized before being conveyed under said conditions of elevated temperature and pressure.

4. A method according to claim 1 wherein the compact mass contains an additive selected from the group consisting of dyeing agents, pigments, lubricants, and stabilizers.

5. A method according to claim 1 wherein the expanding agent is ammonium carbonate.

6. A method of producing a foamed thermoplastic which comprises conveying a thermoplastic material at an elevated temperature and pressure (such that it is at least partially plasticized), mechanically forcing into said thermoplastic material being conveyed a compact mass comprising expanding agent in solid particulate form to form a resulting end mixture under conditions of temperature to form a gas by decomposition of the expanding agent in said thermoplastic, but under a pressure to prevent any substantial formation of cells, and then reducing the pressure on the resulting end mixture to allow the expanding agent to expand and to produce said foamed thermoplastic.

7. A method of producing a foamed thermoplastic which comprises conveying a thermoplastic material at an elevated temperature and pressure (such that it is at least partially plasticized), forcibly screw conveying into said thermoplastic material being conveyed a compact mass comprising expanding agent in solid particulate form to form a resulting end mixture under conditions of temperature to form a gas by decomposition of the expanding agent in said thermoplastic, but under a pressure to prevent any substantial formation of cells, and then reducing the pressure on the resulting end mixture to allow the expanding agent to expand and to produce said foamed thermoplastic.

8. A method of producing a foamed thermoplastic which comprises conveying a thermoplastic material at an elevated temperature and pressure (such that it is at least partially plasticized), introducing forcibly into said thermoplastic material being conveyed an admixture comprising a synthetic thermoplastic material in solid particulate form and an expanding agent to form a resulting end mixture under conditions of temperature to form a gas by decomposition of the expanding agent in said thermoplastic, but under a pressure to prevent any substantial formation of cells, and then reducing the pressure on the resulting end mixture to allow the expanding agent to expand and to produce said foamed thermoplastic.

9. A method according to claim 8 wherein the thermoplastic material is partially plasticized before being conveyed under said conditions of elevated temperature and pressure.

10. A method according to claim 8 wherein the admixture contains an additive selected from the group consisting of dyeing agents, pigments, lubricants, and stabilizers.

11. A method according to claim 8 wherein the expanding agent is ammonium carbonate.

12. A method according to claim 8 wherein a foamed thermoplastic product is formed by passing the resulting end mixture into a mold to allow the expanding agent to expand the resulting end mixture into conformity with the mold.

13. A method according to claim 8 wherein the resulting end mixture is passed through a die in the form of a slot to produce a foamed thermoplastic product in the form of a strip.

14. A method according to claim 8 wherein the resulting end mixture is passed through an annular spaced die to produce a foamed thermoplastic product in the shape of a tube.

15. A method according to claim 14 wherein fluid pressure is applied to the interior of the foamed thermoplastic tube to cause expansion thereof.

16. A method according to claim 8 wherein said thermoplastic material is polyethylene.

17. A method of producing a foamed thermoplastic which comprises conveying thermoplastic material at an elevated temperature and pressure such that it is at least partially plasticized, introducing forcibly into said thermoplastic material being conveyed a compact mass comprising a synthetic thermoplastic material in solid particulate form an expanding agent to form a resulting end mixture under conditions of temperature to form a gas by decomposition of the expanding agent in said thermoplastic, but under a pressure to prevent any substantial formation of cells, and then reducing the pressure on the resulting end mixture to allow the expanding agent to expand and to produce said foamed thermoplastic.

18. A method of producing a foamed thermoplastic which comprises conveying thermoplastic material at an elevated temperature and pressure such that it is at least partially plasticized, introducing forcibly into said thermoplastic material being conveyed a compact mass comprising an expending agent in solid particulate form and a synthetic thermoplastic material in solid particulate form to form a resulting end mixture under conditions of temperature to form a gas by decomposition of the expanding agent in said thermoplastic, but under a pressure to prevent any substantial formation of cells, and then reducing the pressure on the resulting end mixture to allow the expanding agent to expand and to produce said foamed thermoplastic.

19. A method of producing a foamed thermoplastic which comprises conveying thermoplastic material at an elevated temperature and pressure such that it is at least partially plasticized, introducing forcibly into said thermoplastic material being conveyed a compact mass containing substantially only an expanding agent in solid particulate form and a synthetic thermoplastic material in solid particulate form to form a resulting end mixture under conditions of temperature to form a gas by decomposition of the expanding agent in said thermoplastic, but under a pressure to prevent any substantial formation of cells, and then reducing the pressure on the resulting end mixture to allow the expanding agent to expand and to produce said foamed thermoplastic.

20. A method according to claim 19 wherein the thermoplastic material is partially plasticized before being conveyed under said conditions of elevated temperature and pressure.

21. A method according to claim 19 wherein the compact mass contains an additive selected from the group consisting of dyeing agents, pigments, lubricants, and stabilizers.

22. A method according to claim 19 wherein the expanding agent is ammonium carbonate.

23. A method according to claim 19 wherein a foamed thermoplastic product is formed by passing the resulting end mixture into a mold to allow the expanding agent to expand the resulting end mixture into conformity with the mold.

24. A method according to claim 19 wherein said thermoplastic material is polyethylene.

25. A method according to claim 19 wherein the resulting end mixture is passed through a die in the form of a slot to produce a foamed thermoplastic product in the form of a strip.

26. A method according to claim 19 wherein the resulting end mixture is passed through an annular shaped die to produce a foamed thermoplastic product in the shape of a tube.

27. A method according to claim 26 wherein fluid pressure is applied to the interior of the foamed thermoplastic tube to cause expansion thereof.

28. Apparatus for producing a foamed thermoplastic product comprising, in combination, first conveyor means having an inlet for conveying a thermoplastic material through a zone of elevated temperature and pressure to an extrusion die, second conveyor means, having an inlet and an outlet, the outlet being connected to said first conveyor means at a place between said inlet and said extrusion die, for forcibly introducing an expanding agent in solid particulate form into admixture with the thermoplastic material in the zone of elevated temperature and pressure in said first conveyor means, means connected to said second conveyor means for regulating the speed of said second conveyor means to control the introduction of the expanding agent into the zone of elevated temperature and pressure, and reservoir means connected to said second conveyor means for storing the expanding agent.

29. Apparatus according to claim 28 including mold means for forming the foamed thermoplastic product comprising carrier means mounted for rotation adjacent the extrusion die, a plurality of open molds carried by said carrier means and mounted to be moved successively into alignment with the extrusion die in response to rotation of said carrier means, a cover means attached to said apparatus to close at least one end of the open molds during expansion of the thermoplastic material therein, and ejector means positioned adjacent said open molds for removing the foamed thermoplastic product from said open molds.

30. Apparatus according to claim 29 wherein the extrusion die includes a nozzle having a bore through which the thermoplastic material issues, a cap spring mounted over said nozzle and having a convex end with an opening therein, said opening being in register with the bore in said nozzle, and stationary plate means having an opening therein for supporting said cap such that said cap projects into the open molds carried by said plate of said mold means.

31. Apparatus for producing a foamed thermoplastic product comprising, in combination, first means having an inlet for mechanically forcing a thermoplastic material through a zone of elevated temperature and pressure to an extrusion die, second means, having an inlet and an outlet, the outlet being connected to said first means at a place between said inlet and said extrusion die, for mechanically forcing an expanding agent in solid particulate form into admixture with the thermoplastic material in the zone of elevated temperature and pressure in said first means, means connected to said second means for regulating the speed of said second means to control the introduction of the expanding agent into the zone of elevated temperature and pressure, and reservoir means connected to said second means for storing the expanding agent.

32. Apparatus for producing a foamed thermoplastic product comprising, in combination, first screw conveyor means having an inlet for conveying a thermoplastic material through a zone of elevated temperature and pressure to an extrusion die, second screw conveyor means, having an inlet and an outlet, the outlet being connected to said first means at a place between said inlet and said extrusion die, for forcibly introducing an expanding agent in solid particulate form into admixture with the thermoplastic material in the zone of elevated temperature and pressure in said first means, means connected to said second means for regulating the speed of said second means to control the introduction of the expanding agent into the zone of elevated temperature and pressure, and reservoir means connected to said second means for storing the expanding agent.

33. Apparatus for producing a foamed thermoplastic product comprising, in combination, first conveyor means having an inlet for conveying a thermoplastic material through a zone of elevated temperature and pressure to an extrusion die, second conveyor means, having an inlet and an outlet, the outlet being connected to said first conveyor means at a place between said inlet and said extrusion die, for forcibly introducing a compact admixture including a thermoplastic material in solid particulate form and an expanding agent into admixture with the thermoplastic material in the zone of elevated temperature and pressure in said first conveyor means, means connected to said second conveyor means for regulating the speed of said second conveyor means to control the introduction of the admixture into the zone of elevated temperature and pressure, and reservoir means connected to said second conveyor means for storing the admixture.

34. Apparatus according to claim 33 including mold means for forming the foamed thermoplastic product comprising carrier means mounted for rotation adjacent the extrusion die, a plurality of open molds carried by said carrier means and mounted to be moved successively into alignment with the extrusion die in response to rotation of said carrier means, a cover means attached to said apparatus to close at least one end of the open molds during expansion of the thermoplastic material therein, and ejector means positioned adjacent said open molds for removing the foamed thermoplastic product from said open molds.

35. Apparatus according to claim 34 wherein the extrusion die includes a nozzle having a bore through which the thermoplastic material issues, a cap spring mounted over said nozzle and having a convex end with an opening therein, said opening being in register with the bore in said nozzle, and stationary plate means having an opening therein for supporting said cap such that said cap projects into the open molds carried by said plate of said mold means.

36. Apparatus according to claim 33 wherein the extrusion die is in the form of an elongated slot to produce a foamed product in the form of a strip.

References Cited

UNITED STATES PATENTS

| | | | |
|---|---|---|---|
| 1,156,096 | 10/1915 | Price. | |
| 2,329,346 | 9/1943 | Goff. | |
| 2,363,051 | 11/1944 | Dosman | 264—54 |
| 2,515,093 | 7/1950 | Mills | 18—20 XR |
| 2,523,137 | 9/1950 | Nichols et al. | 18—30 |
| 2,641,848 | 6/1953 | Wilson. | |
| 2,834,050 | 5/1958 | Dymsza | 18—30 |
| 2,945,828 | 7/1960 | Henning | 264—54 XR |
| 3,002,229 | 10/1961 | Friederick. | |
| 3,058,161 | 10/1962 | Beyer et al. | 264—47 |
| 3,121,130 | 2/1964 | Wiley et al. | 264—53 |
| 3,150,214 | 9/1964 | Scalora | 264—53 |
| 3,183,553 | 5/1965 | Slater. | |
| 3,212,133 | 10/1965 | Heidrick | 18—12 |
| 3,214,234 | 10/1965 | Bottomly | 264—54 XR |
| 3,287,477 | 11/1966 | Vesilind | 264—53 |

FOREIGN PATENTS

| | | |
|---|---|---|
| 1,178,172 | 3/1959 | France. |
| 864,451 | 1/1953 | Germany. |
| 629,668 | 9/1949 | Great Britain. |
| 351,755 | 3/1961 | Switzerland. |
| 116,652 | 2/1958 | Russia. |

ALEXANDER H. BRODMERKEL, *Primary Examiner.*

P. E. ANDERSON, *Assistant Examiner.*